United States Patent
Gudmundsson et al.

(10) Patent No.: US 6,658,305 B1
(45) Date of Patent: Dec. 2, 2003

(54) METHOD FOR AUTOMATIC SYNTHESIS OF MULTI-VARIABLE CONTROLLERS

(75) Inventors: Thorkell Gudmundsson, San Jose, CA (US); Mark Erickson, San Bruno, CA (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 09/522,372

(22) Filed: Mar. 10, 2000

(51) Int. Cl.$^7$ .............................................. G05B 13/02
(52) U.S. Cl. .............................. 700/52; 700/83; 700/32; 700/33; 700/34
(58) Field of Search ............................... 700/52, 32, 33, 700/34, 83

(56) References Cited

U.S. PATENT DOCUMENTS 5,748,467 A * 5/1998 Qin et al. ..................... 700/50
5,841,652 A * 11/1998 Sanchez ....................... 700/44
6,510,353 B1 * 1/2003 Gudaz et al. .................. 700/37

* cited by examiner

*Primary Examiner*—Anil Khatri
*Assistant Examiner*—Thomas Pham
(74) *Attorney, Agent, or Firm*—Blakely, Sokoloff, Taylor & Zafman LLP (57) ABSTRACT

A method is disclosed for automatic synthesis of multi-variable controllers. A design sequence for designing a controller for a system is selected, wherein the controller includes one or more controller components. A first set of parameters associated to the one or more controller components is then selected. A second set of parameters associated to the first set of parameters is subsequently selected. One or more parameters of the second set are then iteratively modified to obtain a set of modified parameters, until a plurality of performance characteristics calculated using the second set of parameters meets a performance objective for the system.

48 Claims, 8 Drawing Sheets

METHOD FOR AUTOMATIC SYNTHESIS OF MULTI-VARIABLE CONTROLLERS

FIELD OF THE INVENTION

The present invention relates generally to control design methodology and, more particularly, to a method for automatic synthesis of multi-variable controllers.

BACKGROUND OF THE INVENTION

The design and manufacture of new products has become an increasingly complex activity due to reliance on features requiring high performance controllers. In order to design controllers for a dynamic system, a designer must go through a number of operations in a design cycle.

First, a desired performance of the dynamic system is identified and qualified. Then, the designer must create a model characterizing the system. In the process of constructing the model, the designer may rely on prior knowledge encompassing available scientific formulas and on experimental data gathered from previous experiments conducted on the system. The model obtained is a mathematical representation of the system's behavior.

Next, using the model previously created, a controller is designed for the system and the control design is tested to determine the performance of the controlled system. Depending upon the outcome of the tests, several portions of the design may be repeated, until the design results in a final product to be used with the system.

In the control design portion of the design cycle, standard design tools and methodologies are often used to design the controller. However, many systems and manufacturing processes have become too complex for such standard tools and methodologies, and the control design performed by such methodologies is often inadequate.

Existing control design tools and methodologies are created for control designers and require a high level of expertise. One shortcoming of such control design tools and methodologies is the selection of design parameters used in the design process. The design parameters must be selected manually by a knowledgeable designer, which often proves to be a difficult task. A typical example of such a tool is MATLAB® Control System Toolbox, available from Mathworks, Inc. of Natick, Mass.

Other known control design tools and methods attempt to solve the control design problem numerically by applying automatic optimization techniques to the entire set of design parameters in order to find optimal parameter values. For a large number of parameters, the optimization procedure is computationally intractable. One example of such software tool is QDES, described in detail in *Linear Controller Design: Limits of Performance*, by Boyd and Barratt, Prentice Hall 1991.

SUMMARY OF THE INVENTION

A method is disclosed for automatic synthesis of multi-variable controllers. A design sequence for designing a controller for a system is selected, wherein the controller includes one or more controller components. A first set of parameters associated to the one or more controller components is then selected. A second set of parameters associated to the first set of parameters is subsequently selected. One or more parameters of the second set are then iteratively modified to obtain a set of modified parameters, until a plurality of performance characteristics calculated using the second set of parameters meets a performance objective for the system.

Other features and advantages of the present invention will be apparent from the accompanying drawings, and from the detailed description, which follow below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy a disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

Figure 1:
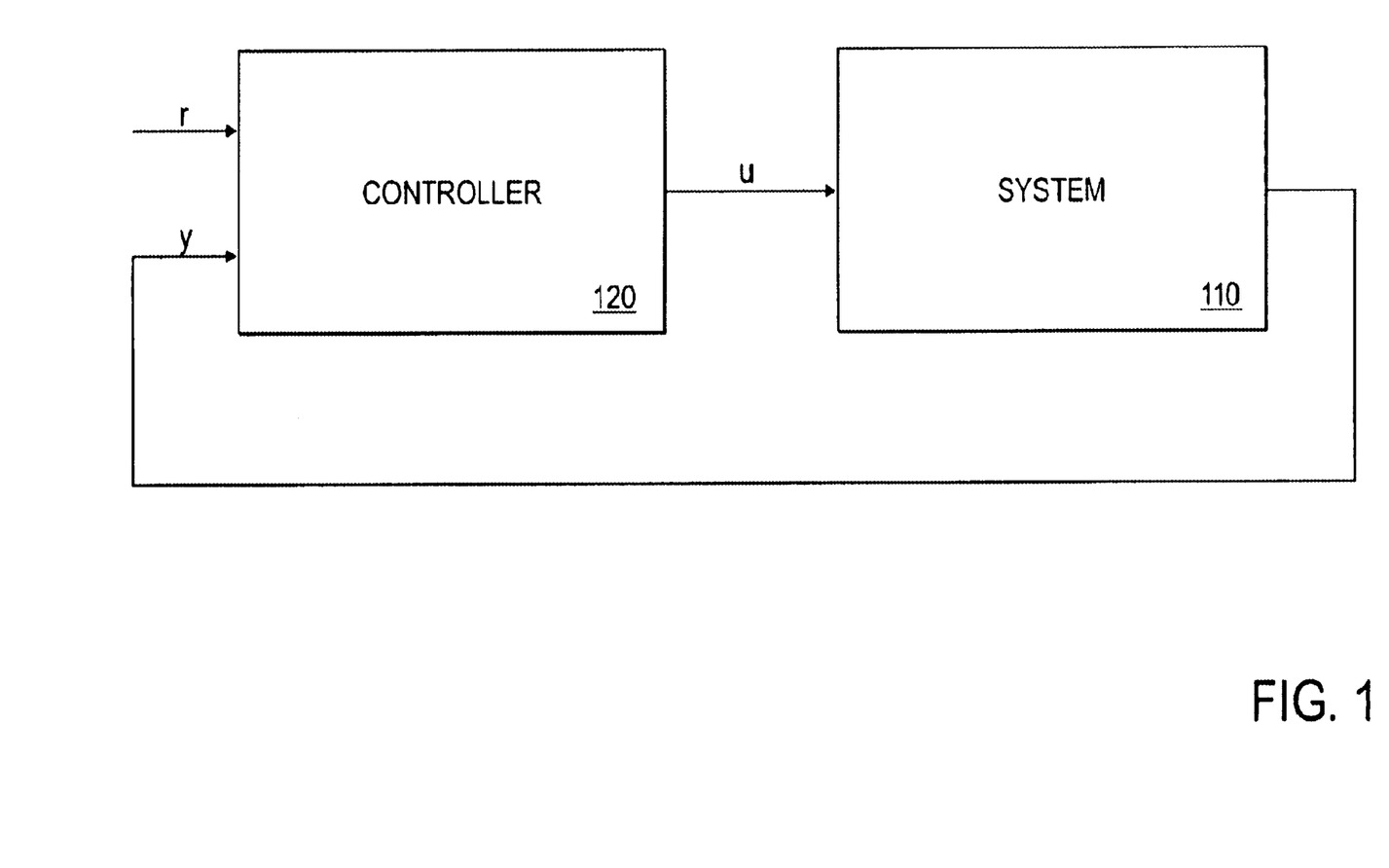
FIG. 1 shows an exemplary control system architecture.

FIG. 1 shows an exemplary closed loop control system architecture 100. In one embodiment, the present invention is described in connection with a closed loop system. Alternatively, the present invention may be implemented with open loop systems.

Referring to FIG. 1, a system 110 is driven by an input signal u, generated by a controller 120. In one embodiment, the controller 120 may use the output y of the system 110 and a reference signal r to generate the input signal u. Alternatively, the controller 120 may operate without either of these signals. In one embodiment, the system 110 is a physical process, the signal u is a computer representation of the physical actuation of the system 110, and the signal y is a computer representation of physical measurements taken from the system 110. Further, the reference signal r is specified by a user, and the controller 120 is implemented as a computational algorithm on a computer system.

According to one embodiment, the system 110 is modeled by a linear multi-input, multi-output (MIMO) system described by:

$$x_{k+1} = Ax_k + Bu_k$$
$$y_k = Cx_k$$

where $x_k$ is a state vector, also known as memory of the system 110, $u_k$ is a vector of input signals, $y_k$ is a vector of output signals, k is a time index with k=0,1,2, . . . , and A, B, and C are matrices of appropriate dimensions. The controller includes a linear estimator and a constant state-feedback regulator with integral action and is described by the following formulas:

$$x'_{k+1} = Ax'_k + Bu_k + L(y_k - y'_k)$$
$$y'_k = Cx'_k$$

$$u_k = K_1 x'_k + K_2 \sum_{i=0}^{k} (r_i - y'_i)$$

where L, $K_1$ and $K_2$ are adjustable gain matrices and represent correction factors, and $x'_k$ and $y'_k$ represent estimations of the state vector and the vector of output signals. In an alternate embodiment, the controller is composed of several such components, with different state vectors and parameters matrices, each for a different range of y. Such controller components are called local controllers. In one embodiment, the adjustable regulator gain matrices $K_1$ and $K_2$ may be computed using linear-quadratic optimization methods from a first set of design parameters $$P = \{R_r, Q_r | R_r > 0, Q_r \geq 0\}$$

where each element of the set of design parameters represents a full parameter matrix of suitable dimensions. In one embodiment, the first set of parameters P includes a large number of parameters. Similarly, the adjustable gain matrix L may also include a large number of parameters.

The controller 120 is designed for a particular system, such as the system 110, so as to achieve a desired level of performance. A sequence of tasks needed to complete a design of the controller for a system is called a design cycle. In one embodiment, the design cycle contains multiple feedback and feedforward paths. A decision to proceed on a particular path is taken based on the status of the design at a particular point in time. Alternatively, the design cycle may be performed without multiple feedback and feedforward paths.

In one embodiment, the designer or user of the design cycle tasks solely selects the design strategy. Alternatively, in selecting a design strategy, the designer may use a real-time planner, as described in U.S. patent application Ser. No. 09/345,172, filed Jun. 30, 1999, entitled Real-Time Planner for Design, to Sunil C. Shah, Pradeep Pandey, Thorkell Gudmundsson, and Mark Erickson, and assigned to Voyan Technology Corporation of Santa Clara, Calif. An example of a design cycle will be described in further detail below.

Figure 2:
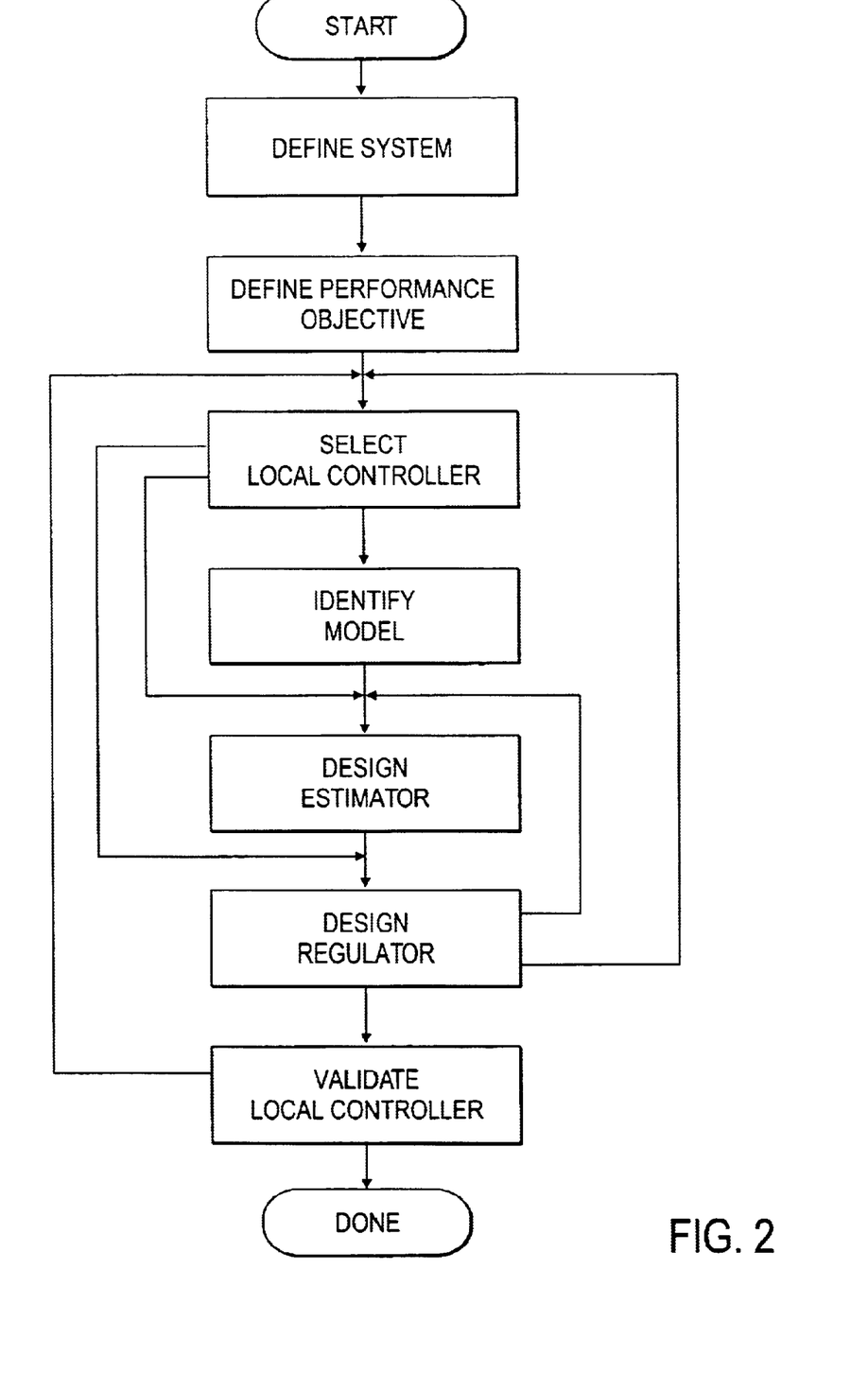
FIG. 2 is a flowchart representing an example of a design cycle.

FIG. 2 illustrates an example of a design cycle for designing a controller for the system. As shown in FIG. 2, the design cycle starts at step 210, with a definition of the system to be controlled and of the control problem to be solved. At step 220, a performance objective is defined. A local controller is selected at step 230 and a model for the local controller is identified at step 240. In one embodiment, the local controller includes the linear estimator and the feedback regulator described above. Alternatively, the controller may include other controller components. The design of the estimator is performed at step 250, followed by the design of a regulator at step 260. The design is subsequently tested to validate the local controller at step 270. A method for automatic synthesis of multi-variable controllers performed in connection with steps 250 and 260 of FIG. 2 will now be described in further detail.

Figure 3:
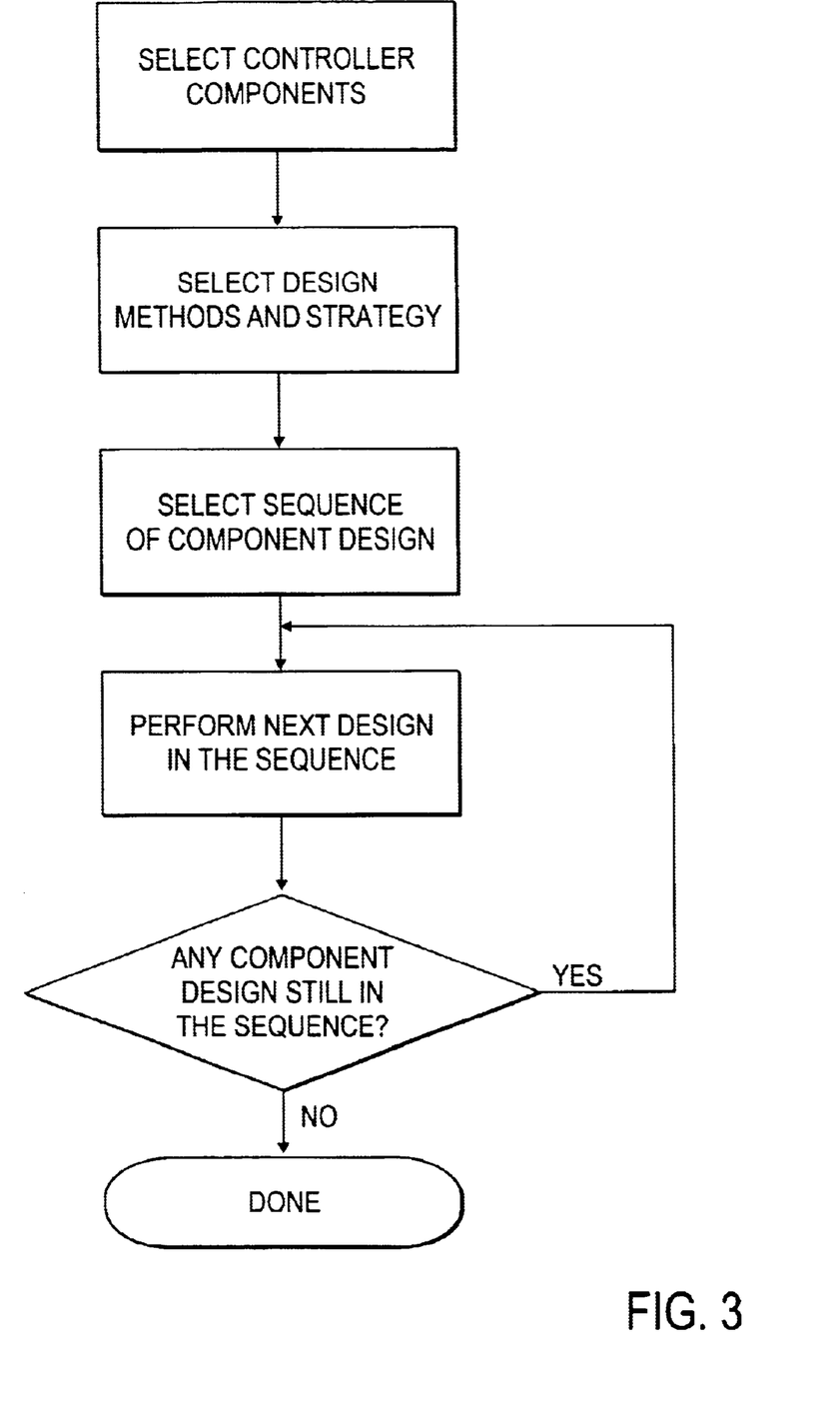
FIG. 3 is a flowchart representing the method for automatic synthesis of a controller, according to one embodiment of the present invention.

FIG. 3 is a flowchart representing the method for automatic synthesis of a controller, according to one embodiment of the present invention. The method is described below in connection with the design of controllers which meet selected performance criteria and which may be composed of several controller components, each requiring a different design method and performance criteria. As shown in FIG. 3, the partition of the controller into controller components is selected at step 310.

The design methods and design strategy are selected at step 320. The design methods selected include a method for computing each controller component from the set of design parameters P and a method for evaluating performance, as described in further detail below.

Next, a sequence for designing the components of the controller is selected at step 330. In one embodiment, each component is designed in a particular order within the sequence selected. Alternatively, design methods may be repetitively applied to some components.

At step 340, a design in the sequence is performed on a particular component, while a decision is subsequently made at step 350 as to whether any component design still has to be performed. If more component designs are to be performed in the sequence, then step 340 is repeated. Otherwise, the process of designing the controller is complete and local validation shown at step 270 in FIG. 2 may be subsequently performed.

Figure 4:
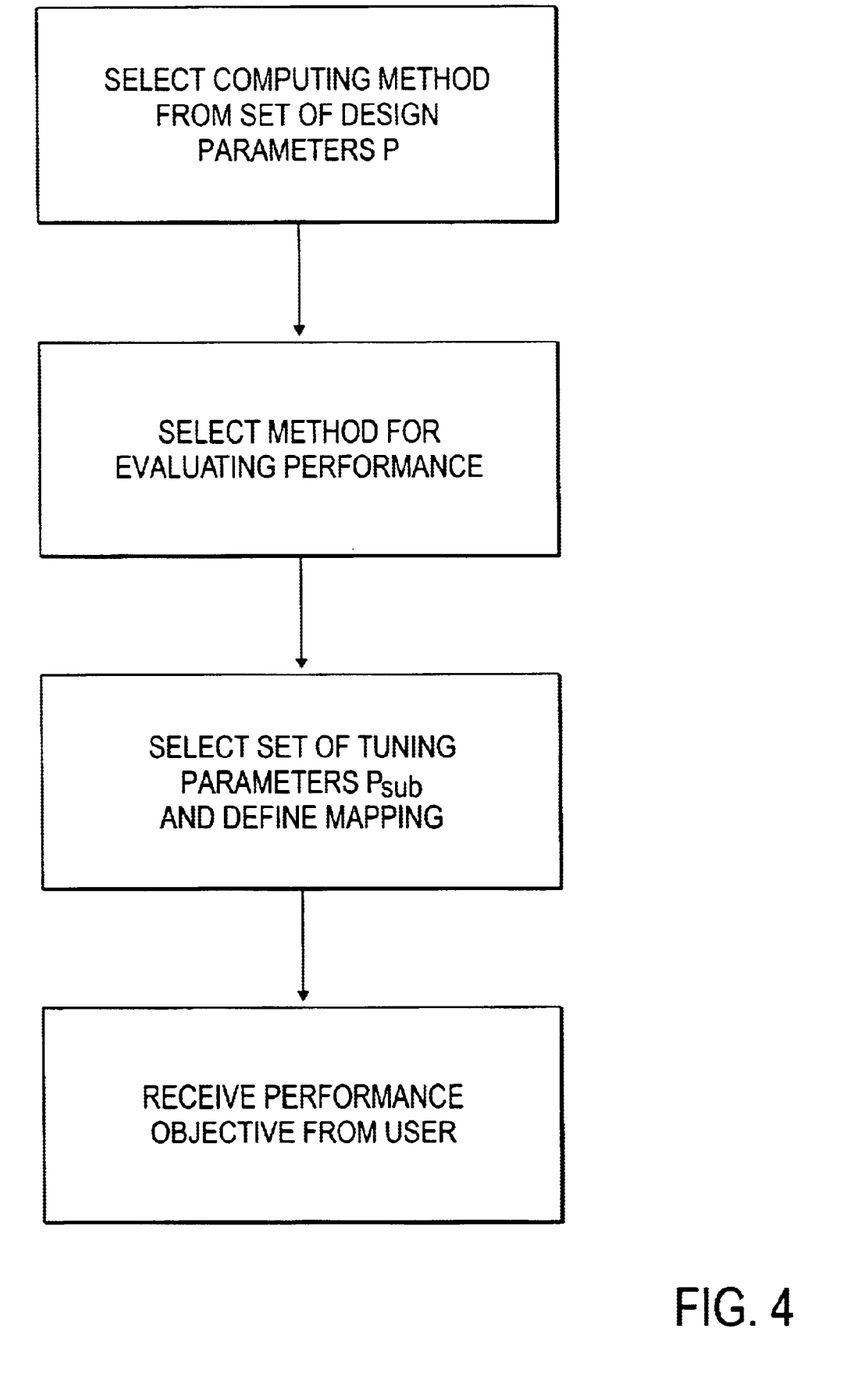
FIG. 4 is a flowchart representing a procedure for selecting design methods and strategy.

FIG. 4 is a flowchart representing a procedure for selecting the design methods and strategy, illustrated as step 320 in FIG. 3. According to FIG. 4, a method for computing a controller component is selected at step 410. In one embodiment, referring to the MIMO system described above, the adjustable regulator gain matrices $K_1$ and $K_2$ may be computed using linear-quadratic optimization methods from a first set of design parameters P, where $$P = \{R_r, Q_r | R_r > 0, Q_r \geq 0\}$$

and where each element of the set of design parameters represents a full parameter matrix of suitable dimensions. Generally, the first set of parameters P includes a large number of parameters.

Referring to the flowchart of FIG. 4, a method for evaluating performance is subsequently selected at step 420. In one embodiment, the performance of the system is evaluated from its time-domain and frequency domain behavior, and is typically measured by factors such as overshoot, undershoot, rise time, settle time, and robustness of the overall system.

At step 430, a second set of parameters called tuning parameters $P_{sub}$ is selected and a mapping $P = h(P_{sub})$ is defined. The set of tuning parameters $P_{sub}$ is selected to simplify the tuning task for the user. In one embodiment, $P_{sub}$ is a proper subset of P. In one embodiment, the second set of parameters $P_{sub}$ may represent parts of the controller that are physically relevant, such as the relative weight of each of the output signals y, or the relative contribution of the different system inputs u.

In one embodiment, referring to the MIMO system and the first set of parameters P described above, the designer selects a second set of parameters $P_{sub}$ as three vectors related to the system inputs and system outputs as follows:

$$P_{sub} = \{V_1, V_2, V_3 | \text{ all elements are positive}\}$$

and defines the mapping to the first set of parameters P as $$R_r = \text{diag}(v_1)$$

$$Q_\tau = \begin{bmatrix} C^T \text{diag}(v_2) C & 0 \\ 0 & \text{diag}(v_3) \end{bmatrix}$$

where C is the matrix describing the linear MIMO system which models the system 110. Alternatively, the designer may use other methods for reducing the number of parameters to be used in the control design process.

Finally, at step 440, a performance objective is received from the user. Among examples of the performance objective received from the user are a maximum allowable overshoot and a maximum allowable rise time.

Figure 5:
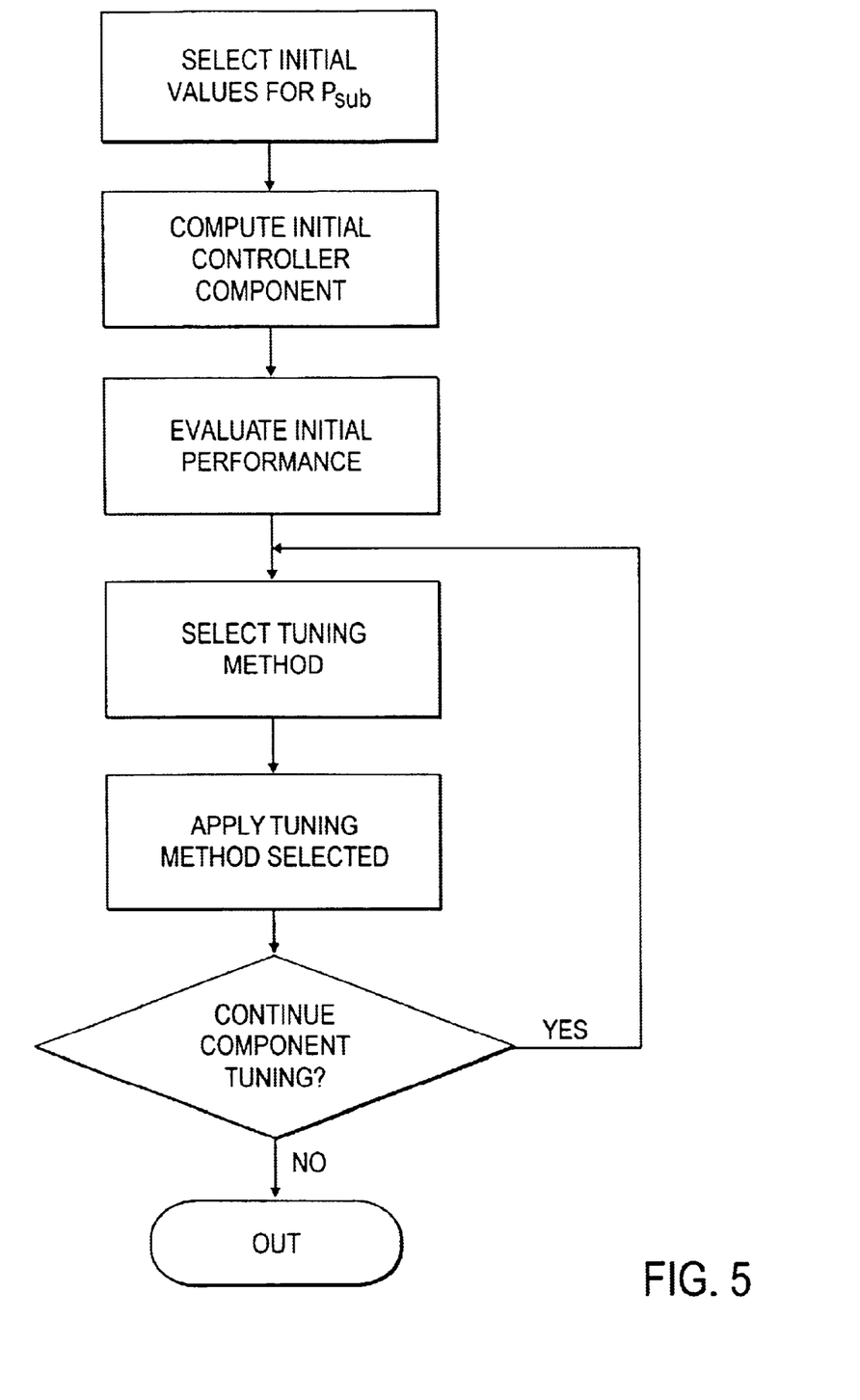
FIG. 5 is a flowchart representing a procedure for performing a design in a selected sequence.

FIG. 5 is a flowchart representing a procedure for performing a design in a selected sequence, illustrated as step 340 in FIG. 3. According to FIG. 5, initial values for one or more parameters of the set of tuning parameters $P_{sub}$ are selected. In one embodiment, if prior designs have been performed on the controller component, then the corresponding set of values for $P_{sub}$ may be used. Alternatively, other available knowledge may be used to compute the set of initial values.

Using the selected set of initial values for $P_{sub}$, the initial controller component is computed at step 520 based on the computing method selected at step 410 in FIG. 4. Initial performance for the initial controller component is subsequently evaluated at step 530 using the method selected at step 420 in FIG. 4. In one embodiment, the initial performance contains several initial performance characteristics.

A tuning method is then selected at step 540. In one embodiment, the tuning method selected is manual, which will be described in further detail below. Alternatively, the tuning method selected is automatic, which will also be described in detail below. The selected tuning method is then applied to the controller component at step 550. After application of the selected tuning method, a decision is made at step 560 whether further tuning is necessary. If further tuning still needs to be performed, then steps 540 and 550 are repeated. Otherwise, the procedure ends at step 570.

Figure 6:
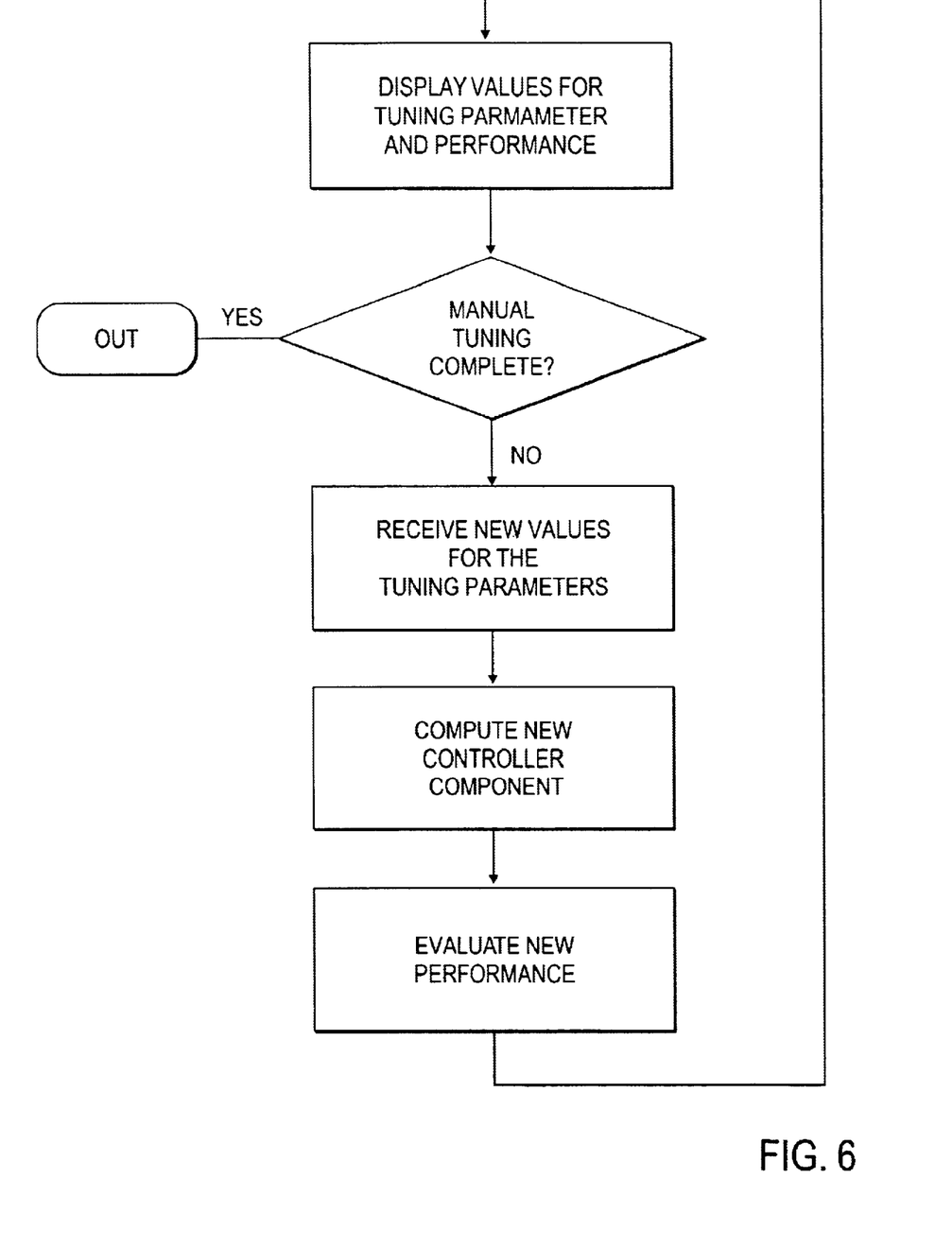
FIG. 6 is a flowchart representing a procedure for applying a manual tuning algorithm.
Figure 8:
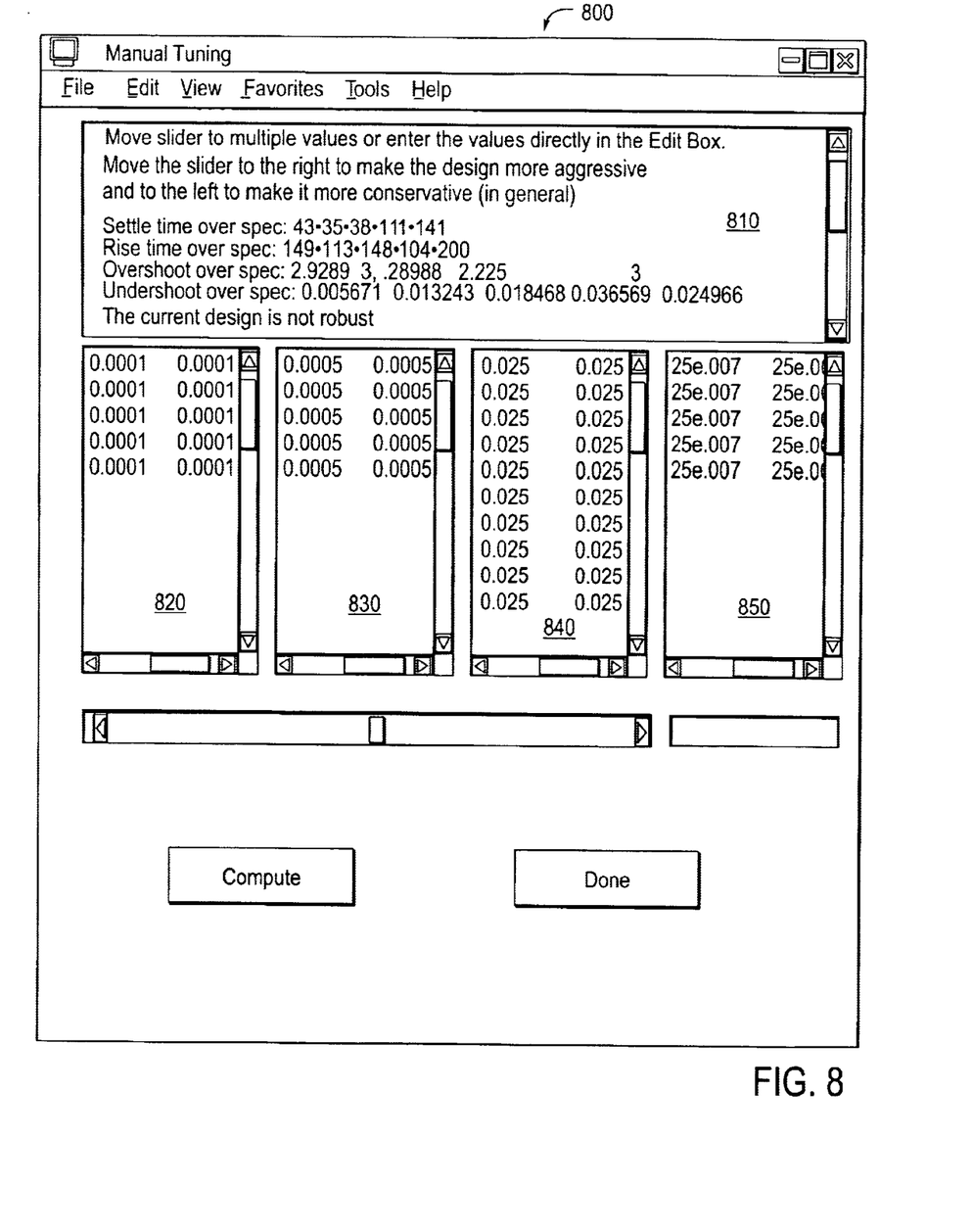
FIG. 8 is an illustration of an interface screen of one embodiment, which displays performance characteristics and design parameters for the user.

FIG. 6 is a flowchart representing a procedure for applying a manual tuning algorithm to the controller component. According to FIG. 6, at step 610, the initial performance characteristics defining the initial performance are displayed together with the set of tuning parameters in a user interface. FIG. 8 is a screen printout of the user interface according to one embodiment of the present invention. In one embodiment, the user interface 800 includes a window 810, displaying the calculated performance characteristics, and four windows 820–850, displaying design parameter values. Windows 820–850 allow the designer or user to select the set of tuning parameters and to modify values for each tuning parameter.

Referring back to FIG. 6, a decision is made at step 620 whether the manual tuning is complete. If the manual tuning is complete, and the initial performance characteristics meet the performance objective, then the algorithm terminates at step 625. Otherwise, new values for one or more parameters of the set of tuning parameters are received at step 630. The designer modifies the displayed values of the tuning parameters if the displayed performance characteristics do not meet the performance objective. In one embodiment, the designer changes the values of individual parameters within windows 820–850 by entering numerical values for each parameter. Alternatively, the designer may move a graphical element, such as a slider, corresponding to each tuning parameter displayed in the windows in order to change the parameter values.

After the designer modifies the displayed values of the tuning parameters, a new controller component is computed at step 640 and new performance characteristics are calculated and evaluated at step 650. The new performance characteristics are iteratively displayed at step 610 together with the modified set of parameters in the user interface shown in FIG. 8.

Figure 7:
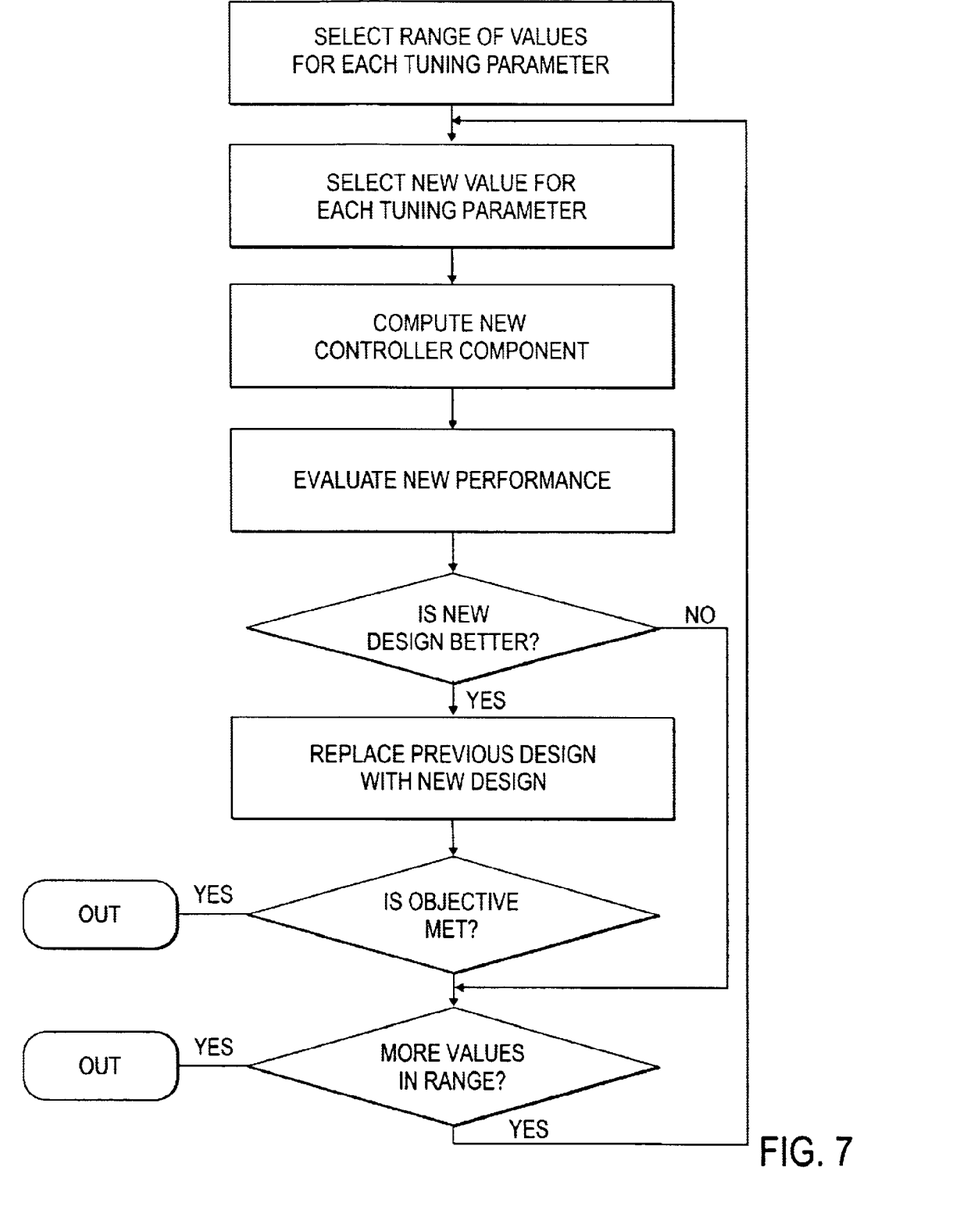
FIG. 7 is a flowchart representing a procedure for applying an automatic tuning algorithm.

FIG. 7 is a flowchart representing a procedure for applying an automatic tuning algorithm. As illustrated in FIG. 7, as soon as initial performance characteristics are calculated using the set of tuning parameters $P_{sub}$, and initial performance is evaluated, a range of parameter values for each parameter of $P_{sub}$ is selected at step 710. At step 720, a new particular value for one or more parameters of the set of tuning parameters is selected. A new controller component is computed at step 730 and new performance characteristics are calculated and evaluated at step 740.

The new performance characteristics are compared to the previous computed performance characteristics at step 750. If the new performance characteristics are better than the performance characteristics of the previous design, in that the performance characteristics are closer to meeting the performance objective, then the previous design is replaced with the new design at step 760.

Next, the new performance characteristics are compared to the performance objective at step 770. If the performance objective is met, then the design process is terminated at step 775. Otherwise, a search is performed at step 780, in order to find out if other parameter values are still available in the range selected. If different values for the tuning parameters are still available in the range, the process is repeated starting with step 720. Otherwise, if no other values are available, the process is also terminated at step 785.

Finally, if, at step 750, the new performance characteristics are inferior to the previous best performance characteristics, then the algorithm skips steps 760 and 770 and jumps directly to step 780.

What is claimed is:

1. A method comprising:
   selecting a design sequence for designing a controller for a system, said controller including at least one controller component;
   selecting a first set of parameters associated to said at least one controller component;
   selecting a second set of parameters associated with said first set of parameters fox said at least one controller component; and
   iteratively modifying at least one parameter of said second set of parameters to obtain a set of modified parameters, until a plurality of performance characteristics calculated using said second set of parameters meets a performance objective for said system,
   wherein iteratively modifying said at least one parameter of said second set of parameters further comprises moving a graphical element corresponding to said at least one parameter of said second set of parameters in said user interface, until said plurality of performance characteristics meets said performance objective.

2. The method according to claim 1, wherein selecting said design sequence further comprises selecting a partition of said controller into said at least one controller component.

3. The method according to claim 1, wherein said controller includes two controller components, an estimator component and a feedback regulator component.

4. The method according to claim 1, wherein selecting said design sequence further comprises:
   selecting a computing method for computing said at least one controller component;
   selecting an evaluating method for evaluating said plurality of performance characteristics;
   selecting a sequence for computing said at least one controller component using said computing method; and
   receiving said performance objective for said system from a user.

5. The method according to claim 1, wherein selecting said second set of parameters further comprises defining a mapping from said second set of parameters to said first set of parameters.

6. The method according to claim 1, wherein selecting said second set of parameters further comprises selecting a set of vectors related to a plurality of inputs and a plurality of outputs for said system and defining a mapping from said set of vectors to said first set of parameters.

7. The method according to claim 1, wherein iteratively modifying said at least one parameter of said second set of parameters further comprises entering a numerical value for said at least one parameter of said second set of parameters in a user interface.

8. The method according to claim 3, wherein said first set of parameters and said second set of parameters further include estimator component parameters.

9. The method according to claim 3, wherein said first set of parameters and said second set of parameters further include feedback regulator component parameters.

10. The method according to claim 4, wherein iteratively modifying said at least one parameter of said second set of parameters further comprises:
    selecting a set of initial values for said at least one parameter of said second set of parameters;
    computing said at least one controller component for said set of initial values using said computing method; and
    evaluating a plurality of initial performance characteristics calculated for said set of initial values using said evaluating method.

11. The method according to claim 10, wherein iteratively modifying said at least one parameter of said second set of parameters further comprises:
    displaying said set of initial values for said at least one parameter of said second set of parameters and said plurality of initial performance characteristics in a user interface for said user.

12. The method according to claim 10, wherein iteratively modifying said at least one parameter of said second set of parameters further comprises:
    selecting a plurality of parameter values for each parameter of said second set of parameters;
    selecting a new parameter value in said plurality of parameter values for said at least one parameter of said second set of parameters to obtain said set of modified parameters;

computing said at least one controller component for said set of modified parameters;

evaluating a plurality of modified performance characteristics calculated for said set of modified parameters using said evaluating method; and comparing said plurality of modified performance characteristics to said plurality of initial performance characteristics.

13. The method according to claim 11, wherein said plurality of initial performance characteristics are displayed in said user interface using a set of plots and a plurality of text outputs.

14. The method according to claim 11, wherein iteratively modifying said at least one parameter of said second set of parameters further comprises entering a numerical value for said at least one parameter of said second set of parameters in said user interface, until said plurality of initial performance characteristics meets said performance objective.

15. The method according to claim 12, wherein iteratively modifying said at least one parameter of said second set of parameters further comprises replacing said set of initial values for said at least one parameter of said second set of parameters with said new parameter value for said at least one parameter, if said plurality of modified performance characteristics is closer to said performance objective than said plurality of initial performance characteristics.

16. The method according to claim 15, wherein iteratively modifying said at least one parameter of said second set of parameters further comprises selecting a second parameter value in said plurality of parameter values for said at least one parameter of said second set of parameters, until said plurality of modified performance characteristics meets said performance objective.

17. A computer readable medium containing executable instructions which, when executed in a processing system, cause said system to perform a method comprising:

selecting a design sequence for designing a controller for a system, said controller including at least one controller component;

selecting a first set of parameters associated to said at least one controller component;

selecting a second set of parameters associated with said first set of parameters for said at least one controller component; and iteratively modifying at least one parameter of said second set of parameters to obtain a set of modified parameters, until a plurality of performance characteristics calculated using said second set of parameters meets a performance objective for said system, wherein iteratively modifying said at least one parameter of said second set of parameters further comprises moving a graphical element corresponding to said at least one parameter of said second set of parameters in said user interface, until said plurality of performance characteristics meets said performance objective.

18. The computer readable medium according to claim 17, wherein selecting said design sequence further comprises selecting a partition of said controller into said at least one controller component.

19. The computer readable medium according to claim 17, wherein said controller includes two controller components, an estimator component and a feedback regulator component.

20. The computer readable medium according to claim 17, wherein selecting said design sequence further comprises:

selecting a computing method for computing said at least one controller component;

selecting an evaluating method for evaluating said plurality of performance characteristics;

selecting a sequence for computing said at least one controller component using said computing method; and receiving said performance objective for said system from a user.

21. The computer readable medium according to claim 17, wherein selecting said second set of parameters further comprises defining a mapping from said second set of parameters to said first set of parameters.

22. The computer readable medium according to claim 17, wherein selecting said second set of parameters further comprises selecting a set of vectors related to a plurality of inputs and a plurality of outputs for said system and defining a mapping from said set of vectors to said first set of parameters.

23. The computer readable medium according to claim 17, wherein iteratively modifying said at least one parameter of said second set of parameters further comprises entering a numerical value for said at least one parameter of said second set of parameters in a user interface.

24. The computer readable medium according to claim 19, wherein said first set of parameters and said second set of parameters further include estimator component parameters.

25. The computer readable medium according to claim 19, wherein said first set of parameters and said second set of parameters further include feedback regulator component parameters.

26. The computer readable medium according to claim 20, wherein iteratively modifying said at least one parameter of said second set of parameters further comprises:

selecting a set of initial values for said at least one parameter of said second set of parameters;

computing said at least one controller component for said set of initial values using said computing method; and evaluating a plurality of initial performance characteristics calculated for said set of initial values using said evaluating method.

27. The computer readable medium according to claim 26, wherein iteratively modifying said at least one parameter of said second set of said parameters further comprises:

displaying said set of initial values for said at least one parameter of said second set of parameters and said plurality of initial performance characteristics in a user interface for said user.

28. The computer readable medium according to claim 26, wherein iteratively modifying said at least one parameter of said second set of parameters further comprises:

selecting a plurality of parameter values for each parameter of said second set of parameters;

selecting a new parameter value in said plurality of parameter values for said at least one parameter of said second set of parameters to obtain said set of modified parameters;

computing said at least one controller component for said set of modified parameters;

evaluating a plurality of modified performance characteristics calculated for said set of modified parameters using said evaluating method; and comparing said plurality of modified performance characteristics to said plurality of initial performance characteristics.

29. The computer readable medium according to claim 27, wherein said plurality of initial performance characteristics are displayed in said user interface using a set of plots and a plurality of text outputs.

30. The computer readable medium according to claim 27, wherein iteratively modifying said at least one parameter of said second set of parameters further comprises entering a numerical value for said at least one parameter of said second set of parameters in said user interface, until said plurality of initial performance characteristics meets said performance objective.

31. The computer readable medium according to claim 28, wherein iteratively modifying said at least one parameter of said second set of parameters further comprises replacing said set of initial values for said at least one parameter of said second set of parameters with said new parameter value for said at least one parameter, if said plurality of modified performance characteristics is closer to said performance objective than said plurality initial performance characteristics.

32. The computer readable medium according to claim 31, wherein iteratively modifying said at least one parameter of said second set parameters further comprises selecting a second parameter value in said plurality of parameter values for said at least one parameter of said second set of parameters, until said plurality of modified performance characteristics meets said performance objective.

33. An article of manufacture comprising a program storage medium readable by a computer and tangibly embodying at least one program of instructions executable by said computer to perform a method comprising:
   selecting a design sequence for designing a controller for a system, said controller including at least one controller component;
   selecting a first set of parameters associated to said at least one controller component;
   selecting a second set of parameters associated with said first set parameters for said at least one controller component; and
   iteratively modifying at least one parameter of said second set of parameters to obtain a set of modified parameters, until a plurality of performance characteristics calculated using said second set of parameters meets a performance objective for said system,
   wherein iteratively modifying said at least one parameter of said second set of parameters further comprises mote a graphical element corresponding to said at least one parameter of said second set of parameters in said user interface, until said plurality of performance characteristics meets said performance objective.

34. The article of manufacture according to claim 33, wherein selecting said design sequence further comprises selecting a partition of said controller into said at least one controller component.

35. The article of manufacture according to claim 33, wherein said controller includes two controller components, an estimator component and a feedback regulator component.

36. The article of manufacture according to claim 33, wherein selecting said design sequence further comprises:
   selecting a computing method for computing said at least one controller component;
   selecting an evaluating method for evaluating said plurality of performance characteristics;
   selecting a sequence for computing said at least one controller: component using said computing method; and
   receiving said performance objective for said system from a user.

37. The article of manufacture according to claim 33, wherein selecting said second set of parameters further comprises defining a mapping from said second set of parameters to said first set of parameters.

38. The article of manufacture according to claim 33, wherein selecting said second set of parameters further comprises selecting a set of vectors related to a plurality of inputs and a plurality of outputs for said system and defining a mapping from said set of vectors to said first set of parameters.

39. The article of manufacture according to claim 33, wherein iteratively modifying said at least one parameter of said second set of parameters further comprises entering a numerical value for said at least one parameter of said second set of parameters in a user interface.

40. The article of manufacture according to claim 35, wherein said, said first set of parameters and said second set of parameters further include estimator component parameters.

41. The article of manufacture according to claim 35, wherein said first set of parameters and said second set of parameters further include feedback regulator component parameters.

42. The article of manufacture according to claim 36, wherein iteratively modifying said at least one parameter of said second set of parameters further comprises:
   selecting a set of initial values for said at least one parameter of second set of parameters;
   computing said at least one controller component for said set of initial values using said computing method; and
   evaluating a plurality of initial performance characteristics calculated for said set of initial values using said evaluating method.

43. The article of manufacture according to claim 42, wherein iteratively modifying said at least one parameter of said second set of parameters further comprises:
   displaying said set of initial values for said at least one parameter of said second set of parameters and said plurality of initial performance characteristics in a user interface for said user.

44. The article of manufacture according to claim 42, wherein iteratively modifying said at least one parameter of said second set parameters further comprises:
   selecting a plurality of parameter values for each parameter of said second set of parameters;
   selecting a new parameter value in said plurality of parameter values for said at least one parameter of said second set of parameters to obtain said set of modified parameters;
   computing said at least one controller component for said set of modified parameters;
   evaluating a plurality of modified performance characteristics calculated for said set of modified parameters using said evaluating method; and
   comparing said plurality of modified performance characteristics to said plurality of initial performance characteristics.

45. The article of manufacture according to claim 43, wherein said plurality of initial performance characteristics are displayed in said user interface using a set of plots and a plurality of text outputs.

46. The article of manufacture according to claim 43, wherein iteratively modifying said at least one parameter of said second set parameters further comprises entering a numerical value for said at least one parameter of said second set of parameters in said user interface, until said plurality of initial performance characteristics meets said performance objective.

47. The article of manufacture according to claim 44, wherein iteratively modifying said at least one parameter of said second set of parameters further comprises replacing said set of initial values for said at least one parameter of said second set of parameters with said new parameter value for said at least one parameter, if said plurality of modified performance characteristics is closer to said performance objective than said plurality initial performance characteristics.

48. The article of manufacture according to claim 47, wherein iteratively modifying said at least one parameter of said second set parameters further comprises selecting a second parameter value in said plurality of parameter values for said at least one parameter of said second set of parameters, until said plurality of modified performance characteristics meets said performance objective.

* * * * *